(12) United States Patent
Heyduck et al.

(10) Patent No.: US 11,952,807 B2
(45) Date of Patent: Apr. 9, 2024

(54) OPTIONAL ACTUATORIC DOOR OPENING SUPPORT FOR A VEHICLE

(71) Applicant: DAIMLER AG, Stuttgart (DE)

(72) Inventors: Jan Heyduck, Sindelfingen (DE); Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 533 days.

(21) Appl. No.: 17/290,293

(22) PCT Filed: Oct. 21, 2019

(86) PCT No.: PCT/EP2019/078538
§ 371 (c)(1),
(2) Date: Apr. 30, 2021

(87) PCT Pub. No.: WO2020/088969
PCT Pub. Date: May 7, 2020

(65) Prior Publication Data
US 2021/0372170 A1    Dec. 2, 2021

(30) Foreign Application Priority Data
Nov. 2, 2018    (DE) ...................... 10 2018 008 668.3

(51) Int. Cl.
*B60J 5/04*    (2006.01)
*E05B 81/16*    (2014.01)
(Continued)

(52) U.S. Cl.
CPC ............. *E05B 81/56* (2013.01); *B60J 5/0472* (2013.01); *B60J 5/0493* (2013.01); *E05B 81/16* (2013.01);
(Continued)

(58) Field of Classification Search
CPC ... B60J 5/04; B60J 5/0472; B60J 5/047; B60J 5/0493; E05B 81/76; E05B 81/77;
(Continued)

(56) References Cited

U.S. PATENT DOCUMENTS

| 5,238,276 A | 8/1993 | Burns |
| 6,108,976 A * | 8/2000 | Kato ....................... E05F 15/00 |
| | | 49/352 |

(Continued)

FOREIGN PATENT DOCUMENTS

| CN | 105257124 A | 1/2016 |
| CN | 205558509 U | 9/2016 |

(Continued)

OTHER PUBLICATIONS

International Search Report dated Jan. 15, 2020 in related/corresponding International Application No. PCT/EP2019/078538.

(Continued)

*Primary Examiner* — Gregory A Blankenship
(74) *Attorney, Agent, or Firm* — PATENT PORTFOLIO BUILDERS PLLC

(57) ABSTRACT

A vehicle door arrangement includes a first closing element arranged on a vehicle door and a second closing element arranged on a bodywork of the vehicle. The first and closing elements can be connected to each other in a positive looking manner to hold the door on the bodywork. A door handle is connected to a sensor for detecting a pressure input or a pulling input of a user on the door handle. The sensor is connected to a control unit, which controls a locking actuator and a door opening actuator. The locking actuator separates the first and second closing elements, and the door opening actuator opens the vehicle door relative to the bodywork. The control unit controls the locking actuator to separate the first closing element and the second closing (Continued)

Figure 1:
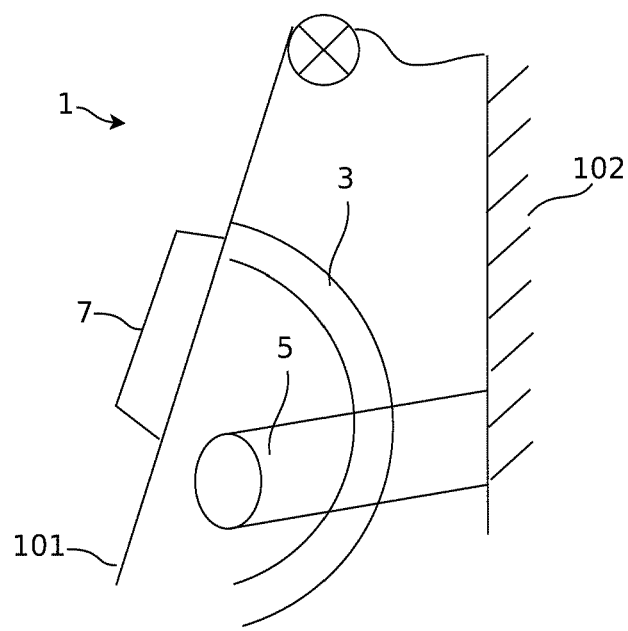

element in response to a detected pressure input or pulling input, and to control the door opening actuator to open the door relative to the bodywork.

9 Claims, 3 Drawing Sheets

(51) Int. Cl.
| | |
|---|---|
| *E05B 81/56* | (2014.01) |
| *E05B 81/76* | (2014.01) |
| *E05B 85/26* | (2014.01) |
| *E05F 15/73* | (2015.01) |
| *E05B 85/16* | (2014.01) |

(52) U.S. Cl.
CPC .............. *E05B 81/77* (2013.01); *E05B 85/26* (2013.01); *E05F 15/73* (2015.01); *E05B 85/16* (2013.01); *E05Y 2400/30* (2013.01); *E05Y 2400/44* (2013.01); *E05Y 2900/531* (2013.01)

(58) Field of Classification Search
CPC .......... E05B 81/16; E05B 85/16; E05F 15/73; E05Y 2400/30; E05Y 2400/44; E05Y 2900/531
See application file for complete search history.

(56) References Cited

U.S. PATENT DOCUMENTS

| | | | |
|---|---|---|---|
| 9,382,741 | B2 | 7/2016 | Konchan et al. |
| 10,329,823 | B2* | 6/2019 | Khan ...................... E05F 15/46 |
| 10,550,611 | B2 | 2/2020 | Och |
| 11,131,126 | B2 | 9/2021 | Ehrlich et al. |
| 11,840,869 | B2* | 12/2023 | Toyama .................. E05B 81/56 |
| 2009/0051192 | A1* | 2/2009 | Ewing ................... E05C 17/006 |
| | | | 296/146.4 |
| 2011/0260496 | A1* | 10/2011 | Yano ........................ B60J 5/047 |
| | | | 296/146.9 |
| 2012/0248796 | A1* | 10/2012 | Kurebayashi ........... E05B 85/26 |
| | | | 292/201 |
| 2015/0069768 | A1* | 3/2015 | Leve ....................... E05B 81/77 |
| | | | 292/336.3 |
| 2018/0223583 | A1* | 8/2018 | Podkopayev ........... F16H 37/04 |
| 2018/0291666 | A1 | 10/2018 | Linden et al. |
| 2019/0017309 | A1* | 1/2019 | Hidaka ................... E05B 85/26 |
| 2019/0277071 | A1* | 9/2019 | Sabatini ................. B60J 5/0468 |
| 2019/0352954 | A1* | 11/2019 | Salter ...................... E05B 81/76 |
| 2020/0160635 | A1* | 5/2020 | Koizumi ................. E05B 85/16 |
| 2020/0225269 | A1* | 7/2020 | Fujiyoshi ................ E05B 81/77 |
| 2020/0369128 | A1* | 11/2020 | Walawender ........... E05B 85/10 |
| 2021/0087861 | A1* | 3/2021 | Marcolino Quintao | |
| | | | Severgnini .............. B60R 25/31 |
| 2021/0138880 | A1* | 5/2021 | Lee ......................... E05B 83/38 |
| 2021/0148144 | A1* | 5/2021 | Schatz .................. B60R 25/246 |
| 2021/0164283 | A1* | 6/2021 | Tamura ................... B60R 25/24 |
| 2021/0172219 | A1* | 6/2021 | Bresser ................... E05B 81/04 |
| 2021/0301561 | A1* | 9/2021 | Cumbo .................... E05B 81/14 |
| 2021/0372170 | A1* | 12/2021 | Heyduck ................. E05B 81/76 |
| 2022/0144207 | A1* | 5/2022 | Maddelein ............... E05B 81/78 |
| 2022/0153214 | A1* | 5/2022 | Tanabe ...................... B60Q 3/80 |
| 2022/0186529 | A1* | 6/2022 | Cumbo .................... E05B 83/38 |
| 2022/0268065 | A1* | 8/2022 | Kato ........................ E05B 81/56 |
| 2023/0079515 | A1* | 3/2023 | Sato ........................ E05B 81/76 |
| | | | 292/336.3 |
| 2023/0160250 | A1* | 5/2023 | Goodchild .............. E05F 15/40 |
| | | | 49/28 |
| 2023/0243192 | A1* | 8/2023 | Konrad ................... E05B 77/04 |
| | | | 70/263 |
| 2023/0258030 | A1* | 8/2023 | Herman ................. B60R 25/23 |
| | | | 292/336.3 |
| 2023/0358080 | A1* | 11/2023 | Taurasi ................... E05B 81/15 |

FOREIGN PATENT DOCUMENTS

| | | |
|---|---|---|
| DE | 10026043 A1 | 12/2001 |
| DE | 102013013298 A1 | 2/2015 |
| DE | 102013112706 A1 | 5/2015 |
| DE | 102015107609 A1 | 11/2015 |
| DE | 102015221413 A1 | 5/2017 |
| DE | 102016217797 A1 | 3/2018 |
| DE | 102017126254 A1 | 6/2018 |
| WO | 2012125130 A1 | 9/2012 |

OTHER PUBLICATIONS

Office Action created on Feb. 17, 2021 in related/corresponding DE Application No. 10 2018 008 668.3.
Written Opinion dated Jan. 15, 2020 in related/corresponding International Application No. PCT/EP2019/078538.
Office Action dated Nov. 30, 2021 in related/corresponding CN Application No. 201980071888.9.
Office Action created Apr. 27, 2023 in related/corresponding DE Application No. 10 2018 008 668.3.

* cited by examiner

OPTIONAL ACTUATORIC DOOR OPENING SUPPORT FOR A VEHICLE

BACKGROUND AND SUMMARY OF THE INVENTION

Exemplary embodiments of the invention relate to a vehicle door arrangement of a vehicle, a vehicle having such a vehicle door arrangement, and a method for opening a vehicle door of a vehicle door arrangement of a vehicle.

DE 10 2015 221 413 A1 relates to a method for carefully opening a vehicle door of a vehicle, wherein the method comprises: determining a status of icing over the vehicle door; and generating an output for a user of the vehicle, wherein the output indicates the status of icing over the vehicle door.

DE 10 2013 112 706 A1 relates to a system made of a door handle, which can be movably mounted in or on a car, and an actuation device for the door handle, wherein the door handle has a handle portion and two mounting portions arranged in the region of opposite ends of the handle portion. The actuation device comprises an actuation lever pivotably connected to a first of the mounting portions with its one end and pivotably mounted between a rest position and an actuation position on a housing portion with its other end, wherein the door handle assumes a closed position in the rest position of the actuation lever and assumes an actuation position in the actuation position of the actuation lever, out of which the door handle can be manually brought into an opening position for unlocking a door lock. The actuation device comprises driving means for moving the actuation lever out of the rest position into the actuation position. The actuation device further comprises at least one slotted guide system, in which the first mounting portion is guided with at least one guiding portion in the event of a movement of the actuation lever between the rest position and the actuation position in such a way that the door handle is moved substantially translationally between its closed position and its actuation position.

DE 100 26 043 A1 relates to a closure for a bonnet or door of a motor vehicle, having a closing bolt which, when the hood or door closes, penetrates into a locking jaw, having a rotary latch, which detects the closing bolt with its latch jaw when the bonnet or door is closed, having a safety catch, which engages in a catch of the rotary latch when the bonnet or door is closed and disengages from the catch when the bonnet or door is open. Opening kinematics are provided that are formed in such a way that the rotary latch is rotationally adjusted in the closing direction when opening the hood or door, in order to form a gap between catch and safety catch before the safety catch is disengaged.

Exemplary embodiments of the invention are directed to supporting the opening of a vehicle door in relation to a bodywork of a vehicle, in particular for weaker older people and in particular in the event of the door seal between the vehicle door and the bodywork of the vehicle icing over.

A first aspect of the invention relates to a vehicle door arrangement of a vehicle, having a first closing element arranged on a vehicle door and a second closing element arranged on a bodywork of the vehicle, wherein the first closing element and the second closing element can be connected to each other in a positive locking manner for holding the vehicle door on the bodywork, further having a door handle arranged on the vehicle door, wherein the door handle is connected to a sensor device for detecting a pressure input or a pulling input of a user on the door handle, and wherein the sensor device is connected to a control unit, and the control unit is designed to control a locking actuator and a door opening actuator, wherein the locking actuator is designed to separate the first closing element and the second closing element, and the door opening actuator is designed to open the vehicle door in relation to the bodywork, and wherein the control unit is designed to control the locking actuator for separating the first closing element and the second closing element in response to a detected pressure input or pulling input, and to control the door opening actuator for opening the vehicle door in relation to the bodywork.

Both a pressure input and a pulling input thus cause the control unit to control the locking actuator for separating the first closing element and the second closing element from each other, and to control the door opening actuator for opening the vehicle door in relation to the bodywork.

Preferably, the door handle is moveably mounted in relation to the vehicle door in a direction directed away from the vehicle door and in a direction directed towards the vehicle door. Then, the pressure input, in particular, causes a movement of the door handle towards the vehicle door and a pulling input of the user a movement of the door handle away from the vehicle door. Alternatively, the pressure input and pulling input are preferably only an application of a correspondingly directed force on a rigidly and immovably designed door handle.

The control unit is preferably designed to recognize whether the first closing element and the second closing element are separate or connected, in order to only control the locking actuator for separating the first closing element and the second closing element when the first closing element and the second closing element are connected to each other. In this respect, the control unit is preferably designed to skip the control of the locking actuator for separating the first closing element and the second closing element when it is recognized by the control unit that the first closing element and the second closing element are already separated from each other, in particular by a separation already carried out by means of a driver identification device, which is preferably a switch arranged on the outside of the bodywork, an electronic vehicle key, or a touch sensor. Then, a pressure input as well as a pulling input only involves the actuated opening of the vehicle door in relation to the bodywork. In particular when separating the first closing element and the second closing element was already carried out in response the signal of a driver identification device, a door sealing counterpressure, a spring force in a hinge of the vehicle door or an actuated impact cylinder or an impact cylinder driven by spring force preferably ensures an initial door opening by a specific gap, away from which the vehicle door can be manually opened in relation to the bodywork, or optionally with the aid of a pressure input or a pulling input on the door handle, which causes the control unit to control the door opening actuator for opening the vehicle door in relation to the bodywork in order to thus perform the door opening in an actuatoric manner.

The vehicle can be a passenger vehicle, lorry, bus, rail vehicle or an airplane.

An advantageous effect of the invention is that the opening of a vehicle door in relation to a bodywork of a vehicle is supported, in particular for weaker and older people and, in particular, in the event of the door seal between the vehicle door and the bodywork of the vehicle icing over, in particular by means of an optionally activatable actuator.

According to an advantageous embodiment, the door handle is countersunk at least partially in the vehicle door as a result of the presence of a pulling input and the presence of a pressure input and can be elevated out of the latching position by pressing the door handle.

According to a further advantageous embodiment, a cavity is arranged below the door handle on the vehicle door, in order to space the door handle apart from the vehicle door, such that a gripping space is formed for inserting fingers between the door handle and the vehicle door.

According to a further advantageous embodiment, the first closing element has a rotary latch and the second closing element a bolt, wherein the rotary latch and the bolt can be fixed to each other when connecting the first closing element to the second closing element by rotating the rotary latch about the bolt.

According to a further advantageous embodiment, the control unit is designed to only control the door opening actuator for opening the vehicle door in relation to the bodywork when the first closing element and the second closing element are completely separated from each other.

According to a further advantageous embodiment, the control unit is designed to control the locking actuator for holding the first closing element and the second closing element in the separated state during the time period of a detected pulling input.

According to a further advantageous embodiment, the control unit is designed to control the locking actuator for separating the first closing element and the second closing element in response to a detected pulling input within a first threshold value, when the first closing element and the second closing element are connected to each other, and to control the door opening actuator for opening the vehicle door in relation to the bodywork in response to a detected pulling input between the first and the second threshold value, wherein the second threshold value is greater than the first threshold value.

According to a further advantageous embodiment, the control unit is designed to control the locking actuator for separating the first closing element and the second closing element in response to a signal of a driver identification device.

The driver identification device is preferably a mechanical and/or electronic key.

A further aspect of the invention relates to a vehicle having a vehicle door arrangement as described above and below.

A further aspect of the invention relates to a method for opening a vehicle door of a vehicle door arrangement of a vehicle, wherein the vehicle door arrangement has a first closing element arranged on a vehicle door and a second closing element arranged on a bodywork of the vehicle, wherein the first closing element and the second closing element are connected to each other in a positive locking manner for holding the vehicle door on the bodywork, having the following steps:
- performing a pressure input or a pulling input by a user on a door handle arranged on the vehicle door,
- detecting the pressure input or the pulling input by means of a sensor device, wherein the sensor device is connected to a control unit,
- controlling a locking actuator and a door opening actuator by means of the control unit in response to the detected pressure input or pulling input in such a way that the locking actuator is controlled to separate the first closing element and the second closing element, and the door opening actuator is controlled to open the vehicle door in relation to the bodywork.

Advantages and preferred developments of the proposed method emerge by means of an analogous and logical transferral of the designs made above in connection with the proposed vehicle door arrangement.

Further advantages, features and details emerge from the description below in which—if necessary referring to the drawing—at least one exemplary embodiment is described in detail. The same, similar and/or functionally identical parts are provided with the same reference numerals.

BRIEF DESCRIPTION OF THE DRAWING FIGURES

Figure 2:
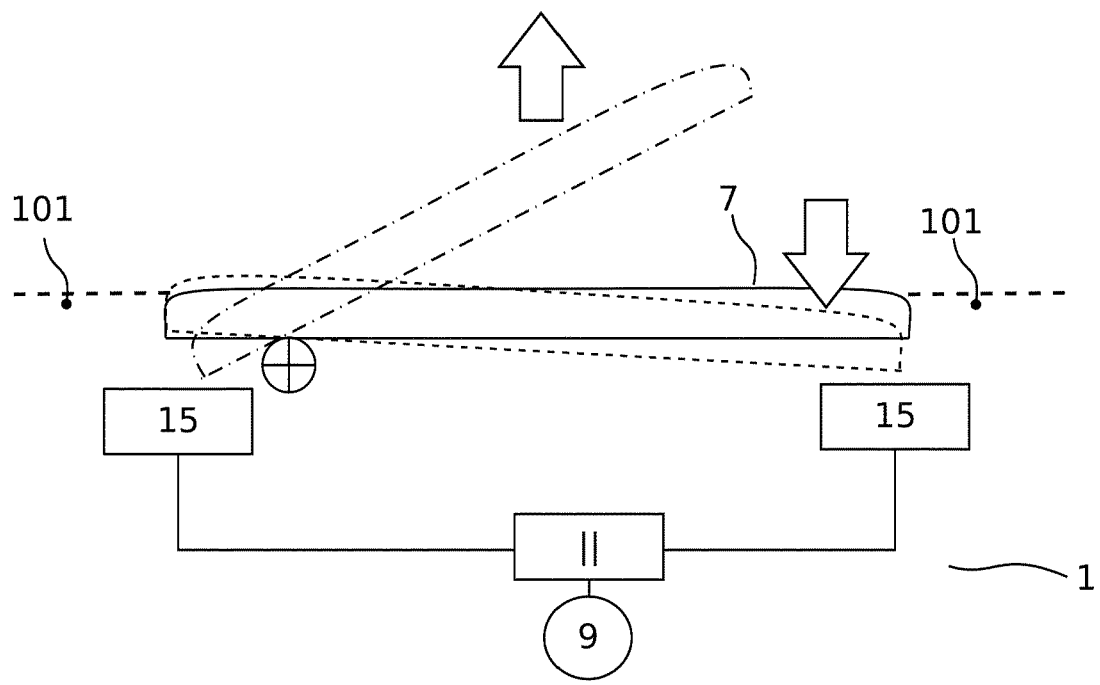
Figure 3:
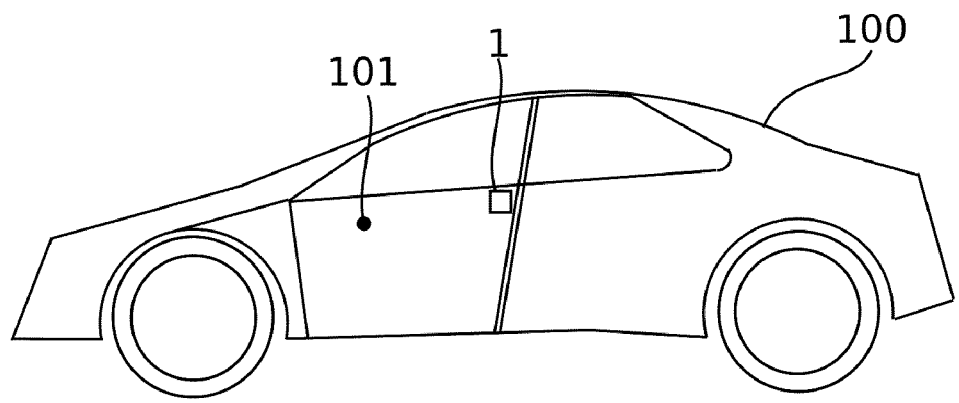
Figure 4:
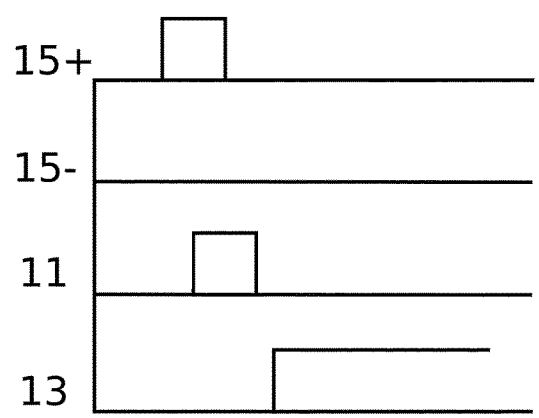
Figure 5:
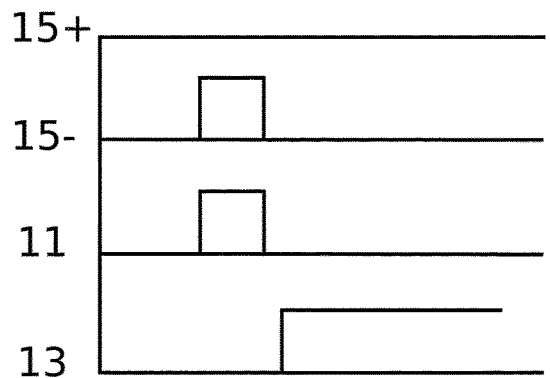
Figure 6:
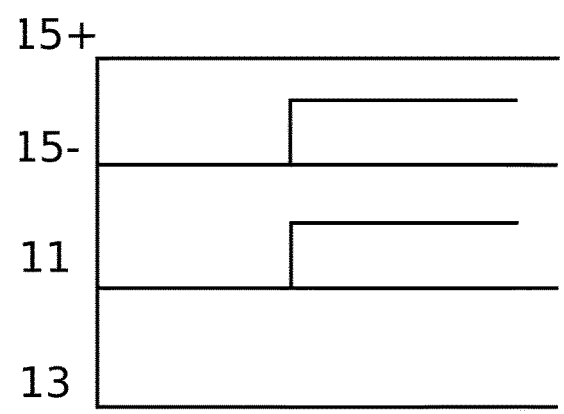
Figure 7:
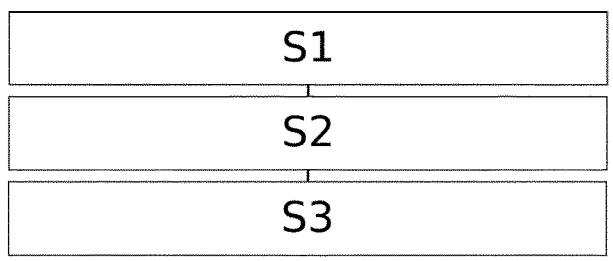

Here are shown:

FIG. 1 a cut-out of a vehicle door arrangement according to an exemplary embodiment of the invention, FIG. 2 a cut-out of a vehicle door arrangement according to a further exemplary embodiment of the invention, FIG. 3 a vehicle having a vehicle door arrangement according to a further exemplary embodiment of the invention, FIG. 4 a course of events of a pulling input, a course of events of a pressure input, the activity of a locking actuator, and the activity of a door opening actuator, in each case of a vehicle door arrangement according to a further exemplary embodiment of the invention, FIG. 5 a course of events of a pulling input, a course of events of a pressure input, the activity of a locking actuator, and the activity of a door opening actuator, in each case of a vehicle door arrangement according to a further exemplary embodiment of the invention, FIG. 6 a course of events of a pulling input, a course of events of a pressure input, the activity of a locking actuator, and the activity of a door opening actuator, in each case of a vehicle door arrangement according to a further exemplary embodiment of the invention, and FIG. 7 a method for opening a vehicle door according to a further exemplary embodiment of the invention.

The depictions in the figures are schematic and not true to scale.

DETAILED DESCRIPTION

FIG. 1 shows a cut-out of a vehicle door arrangement 1 of a vehicle 100, having a first closing element 3 arranged on a vehicle door 101 and a second closing element 5 arranged on a bodywork 102 of the vehicle 100, wherein the first closing element 3 and the second closing element 5 can be connected to each other in a positive locking manner to hold the vehicle door 101 on the bodywork 102. In doing so, the first closing element 3 has a rotary latch and the second closing element 5 a bolt, wherein the rotary latch and the bolt can be fixed to each other when connecting the first closing element 3 to the second closing element 5 by rotating the rotary latch around the bolt. Furthermore, a door handle 7 is arranged on the vehicle door 101, wherein the door handle 7 is connected to a sensor device 15—not depicted in FIG. 1—for detecting a pressure input or pulling input of a user on the door handle 7.

FIG. 2 shows a cut-out of a vehicle door arrangement 1 of a vehicle 100, wherein a door handle 7 is arranged on a vehicle door 101, wherein the door handle 7 is connected to a sensor device 15 for detecting a pressure input or a pulling input of a user on the door handle 7. The door handle 7 is at least partially countersunk in the vehicle door 101 as a result of the presence of a pulling input and the presence of a pushing input and is rotatably mounted asymmetrically, such that the door handle 7 can be moved away from the vehicle door 101 for a pulling input, such that the left branch of the sensor device 15 is activated, and the right branch of the sensor device 15 is activated by means of a pressure input, e.g., by exerting a pressure force on the geometric center of the door handle 7.

FIG. 3 shows a vehicle 100 having a vehicle door arrangement 1 of the type shown in FIG. 1 and FIG. 2.

FIG. 4 shows a course of events of a pressure input, characterized by a positive force 15+ detected by the sensor device 15 on the door handle 7, a course of events of a pulling input, characterized by a negative force 15—detected by the sensor device 15 on the door handle 7, the activity of the locking actuator 11 and the activity of the door opening actuator 13, in each case during the time which is allocated to the horizontal axis. The sensor device 15 is connected to a control unit 9, and the control unit 9 is designed to control a locking actuator 11 and a door opening actuator 13, wherein the locking actuator 11 is designed to separate the first closing element 3 and the second closing element 5, and the door opening actuator 13 is designed to open the vehicle door 101 in relation to the bodywork 102. In FIG. 4, only a pressure input is carried out, in response to which the control unit 9 controls the locking actuator 11 to separate the first closing element 3 and the second closing element 5 immediately after the start of the pressure input, and controls the door opening actuator 13 to open the vehicle door 101 in relation to the bodywork 102 after the successful separation.

FIG. 5 shows a course of events of a pressure input, characterized by a positive force 15+ detected by the sensor device 15 on the door handle 7, a course of events of a pulling input, characterized by a negative force 15—detected by the sensor device 15 on the door handle 7, the activity of the locking actuator 11 and the activity of the door opening actuator 13, in each case during the time which is allocated to the horizontal axis. The sensor device 15 is connected to a control unit 9, and the control unit 9 is designed to control a locking actuator 11 and a door opening actuator 13, wherein the locking actuator 11 is designed to separate the first closing element 3 and the second closing element 5, and the door opening actuator 13 is designed to open the vehicle door 101 in relation to the bodywork 102. In FIG. 5, only a pulling input is carried out, the control unit 9 controls the locking actuator 11 to separate the first closing element 3 and the second closing element 5, and controls the door opening actuator 13 to open the vehicle door 101 in relation to the bodywork 102 after the successful separation and end of the pulling input.

FIG. 6 shows a course of events of a pressure input, characterized by a positive force 15+ detected by the sensor device 15 on the door handle 7, a course of events of a pulling input, characterized by a negative force 15—detected by the sensor device 15 on the door handle 7, the activity of the locking actuator 11 and the activity of the door opening actuator 13, in each case during the time which is allocated to the horizontal axis. The sensor device 15 is connected to a control unit 9, and the control unit 9 is designed to control a locking actuator 11 and a door opening actuator 13, wherein the locking actuator 11 is designed to separate the first closing element 3 and the second closing element 5, and the door opening actuator 13 is designed to open the vehicle door 101 in relation to the bodywork 102. In FIG. 6, only a pulling input is carried out, and the control unit 9 controls the locking actuator 11 to hold the first closing element 3 and the second closing element 5 in the separated state, such that the opening force of the door opening actuator 13 acting against a connection of the first closing element 3 and the second closing element 5 is avoided.

FIG. 7 shows a method for opening a vehicle door 101 of a vehicle door arrangement 1 of a vehicle 100, wherein the vehicle door arrangement 1 has a first closing element 3 arranged on a vehicle door 101 and a second closing element 5 arranged on a bodywork 102 of the vehicle 100, wherein the first closing element 3 and the second closing element 5 can be connected to each other in a positive locking manner to hold the vehicle door 101 on the bodywork 102, having the following steps:

performing S1 a pressure input or a pulling input by a user on a door handle 7 arranged on the vehicle door 101, detecting S2 the pressure input or the pulling input by means of a sensor device 15, wherein the sensor device 15 is connected to a control unit 9, controlling S3 a locking actuator 11 and a door opening actuator 13 by means of the control unit 9 in response to the detected pushing input or pulling input in such a way that the locking actuator 11 is controlled to separate the first closing element and the second closing element, and the door opening actuator 13 is controlled to open the vehicle door 101 in relation to the bodywork 102.

Although the invention has been illustrated and explained in more detail by preferred exemplary embodiments, the invention is thus not limited by the disclosed examples, and other variations can be derived by the person skilled in the art from this without leaving the scope of protection of the invention. It is thus clear that a plurality of variation possibilities exist. It is also clear that embodiments mentioned by way of example actually only constitute examples which are in no way to be interpreted as limitations, for example, of the scope of protection, the application possibilities or the configuration of the invention. Instead, the description above and the description of the figures put the person skilled in the art in a position of being able to concretely implement the exemplary embodiments, wherein the person skilled in the art can, when aware of the disclosed inventive concept, undertake various amendments, for example in relation to the function or the arrangement of individual elements mentioned in an exemplary embodiment, without leaving the scope of protection which is defined by the claims and their legal counterparts, such as further explanations in the description, for example.

The invention claimed is:

1. A vehicle door arrangement of a vehicle, the vehicle door arrangement comprising:
  a first closing element arranged on a vehicle door;
  a second closing element arranged on a bodywork of the vehicle, wherein the first closing element and the second closing element are configured to be connected to each other in a positive looking manner to hold the vehicle door on the bodywork;
  a door handle arranged on the vehicle door;
  a sensor device connected to the door handle, wherein the sensor device is configured to detect a pressure input or a pulling input of a user on the door handle;
  a control unit connected to the sensor device, wherein the control unit is configured to control a locking actuator and a door opening actuator,
  wherein the locking actuator is configured to separate the first and second closing elements,
  wherein the door opening actuator is configured to open the vehicle door in relation to the bodywork, wherein the control unit is configured to control the locking actuator to separate the first closing element and the second closing element in response to a detected pressure input or pulling input, and to control the door opening actuator to open the vehicle door in relation to the bodywork, and wherein the door handle is at least partially countersunk in the vehicle door when a pressure input is present and is elevatable out of a depression by pressing the door handle.

2. The vehicle door arrangement of claim 1, wherein the depression is a cavity arranged below the door handle on the vehicle door that spaces the door handle apart from the vehicle door such that a gripping space is formed to insert fingers between the door handle and vehicle door.

3. The vehicle door arrangement of claim 1, wherein the first closing element has a rotary latch, the second closing element has a bolt, the rotary latch and the bolt are fixable to each other when connecting the first closing element to the second closing element by rotating the rotary latch around the bolt.

4. The vehicle door arrangement of claim 1, wherein the control unit is configured to only control the door opening actuator to open the vehicle door in relation to the bodywork when the first and second closing elements are completely separated from each other.

5. The vehicle door arrangement of claim 1, wherein the control unit is configured to control the locking actuator to hold the first closing element and the second closing element in the separated state during a period of time of a detected pulling input.

6. The vehicle door arrangement of claim 1, wherein the control unit is configured to control the locking actuator to separate the first and second closing elements responsive to a detected pulling input within a first threshold value when the first closing element and a second closing element are connected to each other, and to control the door opening actuator to open the vehicle door relative to the bodywork responsive to a detected pulling input between the first threshold value and a second threshold value, wherein the second threshold value is greater than the first threshold value.

7. The vehicle door arrangement of claim 1, wherein the control unit is configured to control the locking actuator to separate the first closing element and the second closing element responsive to a signal of a driver identification device.

8. A vehicle, comprising:
a vehicle door;
bodywork; and
a vehicle door arrangement, comprising
a first closing element arranged on the vehicle door;
a second closing element arranged on the bodywork of the vehicle, wherein the first closing element and the second closing element are configured to be connected to each other in a positive looking manner to hold the vehicle door on the bodywork;

a door handle arranged on the vehicle door;

a sensor device connected to the door handle, wherein the sensor device is configured to detect a pressure input or a pulling input of a user on the door handle;

a control unit connected to the sensor device, wherein the control unit is configured to control a locking actuator and a door opening actuator, wherein the locking actuator is configured to separate the first and second closing elements, wherein the door opening actuator is configured to open the vehicle door in relation to the bodywork, wherein the control unit is configured to control the locking actuator to separate the first closing element and the second closing element in response to a detected pressure input or pulling input, and to control the door opening actuator to open the vehicle door in relation to the bodywork, wherein the door handle is at least partially countersunk in the vehicle door when a pressure input is present and is elevatable out of a depression by pressing the door handle.

9. A method for opening a vehicle door of a vehicle door arrangement of a vehicle, wherein the vehicle door arrangement has a first closing element arranged on a vehicle door and a second closing element arranged on a bodywork of the vehicle, wherein the first closing element and the second closing element are connectable to each other in a positive locking manner to hold the vehicle door on the bodywork, the method comprising:

performing a pressure input or a pulling input by a user on a door handle arranged on the vehicle door;

detecting, by a sensor, a pressure input or a pulling input by a user on a door handle arranged on the vehicle door, wherein the sensor is connected to a control unit; and controlling, by the control unit responsive to the detected pushing input or pulling input, a locking actuator and a door opening actuator in such a way that the locking actuator is controlled to separate the first closing element and the second closing element, and the door opening actuator is controlled to open the vehicle door relative to the bodywork wherein the door handle is at least partially countersunk in the vehicle door when a pressure input is present and is elevatable out of a depression by pressing the door handle.

* * * * *